US010049652B1

(12) United States Patent
Smith et al.

(10) Patent No.: US 10,049,652 B1
(45) Date of Patent: Aug. 14, 2018

(54) MULTI-FUNCTION APPARATUS WITH ANALOG AUDIO SIGNAL AUGMENTATION TECHNOLOGY

(71) Applicant: Intel Corporation, Santa Clara, CA (US)

(72) Inventors: Ned M. Smith, Beaverton, OR (US); Mats Agerstam, Portland, OR (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/476,731

(22) Filed: Mar. 31, 2017

(51) Int. Cl.
*G10K 11/178* (2006.01)
*G06F 3/16* (2006.01)

(52) U.S. Cl.
CPC ............ *G10K 11/178* (2013.01); *G06F 3/165* (2013.01); *G10K 11/1782* (2013.01); *G10K 2210/3014* (2013.01); *G10K 2210/3025* (2013.01); *G10K 2210/3044* (2013.01)

(58) Field of Classification Search
CPC ... G10K 2210/1081; G10K 2210/1082; G10K 2210/12; G10K 2210/3023; G10K 2210/3216
See application file for complete search history.

(56) References Cited

U.S. PATENT DOCUMENTS

2014/0341388 A1* 11/2014 Goldstein ............ H04R 1/1083 381/71.11
2015/0248879 A1* 9/2015 Miskimen ............ G10K 11/178 381/71.6
2015/0373474 A1* 12/2015 Kraft .................... H04R 1/1083 381/17
2016/0142820 A1* 5/2016 Kraft .................... H04R 1/1083 381/94.3
2016/0232886 A1* 8/2016 Vaidhyanathan .... G10K 11/178
2016/0315808 A1* 10/2016 Saavedra ................ H04L 47/24
2017/0147281 A1* 5/2017 Klimanis ................ G06F 3/165
2017/0147284 A1* 5/2017 Klimanis ................ G06F 3/165
2017/0178072 A1* 6/2017 Poornachandran .......................... G06Q 10/0833
2017/0195777 A1* 7/2017 Klimanis ............ H04R 1/1083

* cited by examiner

*Primary Examiner* — Mohammad Islam
(74) *Attorney, Agent, or Firm* — Schwabe, Williamson & Wyatt, P.C.

(57) ABSTRACT

Multi-function apparatuses and methods associated with augmenting an analog audio signal are disclosed herein. In embodiments, a multi-function apparatus for performing a plurality of functions may include a microphone to receive a propagated analog audio signal and ambient noise; a receiver to receive a digitally streamed version of the analog audio signal; a harmonizer, that includes a plurality of processors, to generate a digital adjusted version of the analog signal including noise canceling signal to cancel some or all of the ambient noise, based on the propagated analog audio signal, the ambient noise, and the digitally streamed version of the analog audio signal; and a digital-to-analog converter to convert the digital adjusted version of the analog signal to an analog adjusted version of the analog signal. The analog adjusted version of the analog signal may then be outputted to augment the propagated analog audio signal. Other embodiments may be disclosed or claimed.

25 Claims, 6 Drawing Sheets

MULTI-FUNCTION APPARATUS WITH ANALOG AUDIO SIGNAL AUGMENTATION TECHNOLOGY

TECHNICAL FIELD

The present disclosure relates to the field of electronic devices, in particular, to a multi-function apparatus with analog audio signal augmentation technology, and associated methods or computer readable storage medium.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Many people now carry mobile devices with personal listening capabilities (e.g., phone speakers, earbuds or other sound producing actuator) that are tuned for listening within a personal space (<0.5 m; including <1 cm). Within these ranges sound waves can be personalized to an individual user; even when another individual is nearby. However, when users are attending public events (sporting events, concerts, commencements, conferences etc.) the use of personal listening actuators (speakers) competes with the public address system within the personal space. As a result, users typically turn the speakers off.

On the other hand, public address systems generally do not provide ideal listening experiences because the propagation delays associated with sound waves often results in noticeable latency as the compression wave travels through the air. Most noticeable are echoes or reflections resulting from the various non-sound-absorbing construction materials that often accompany these events. Echoes often make the listening experience difficult or impossible. Room acoustics designers typically address echoes by installing expensive sound clouds and other sound-deadening materials. Even with these aids, micro echoes can occur affecting the ambient sounds at frequencies most people's brains are not accustomed to filtering.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
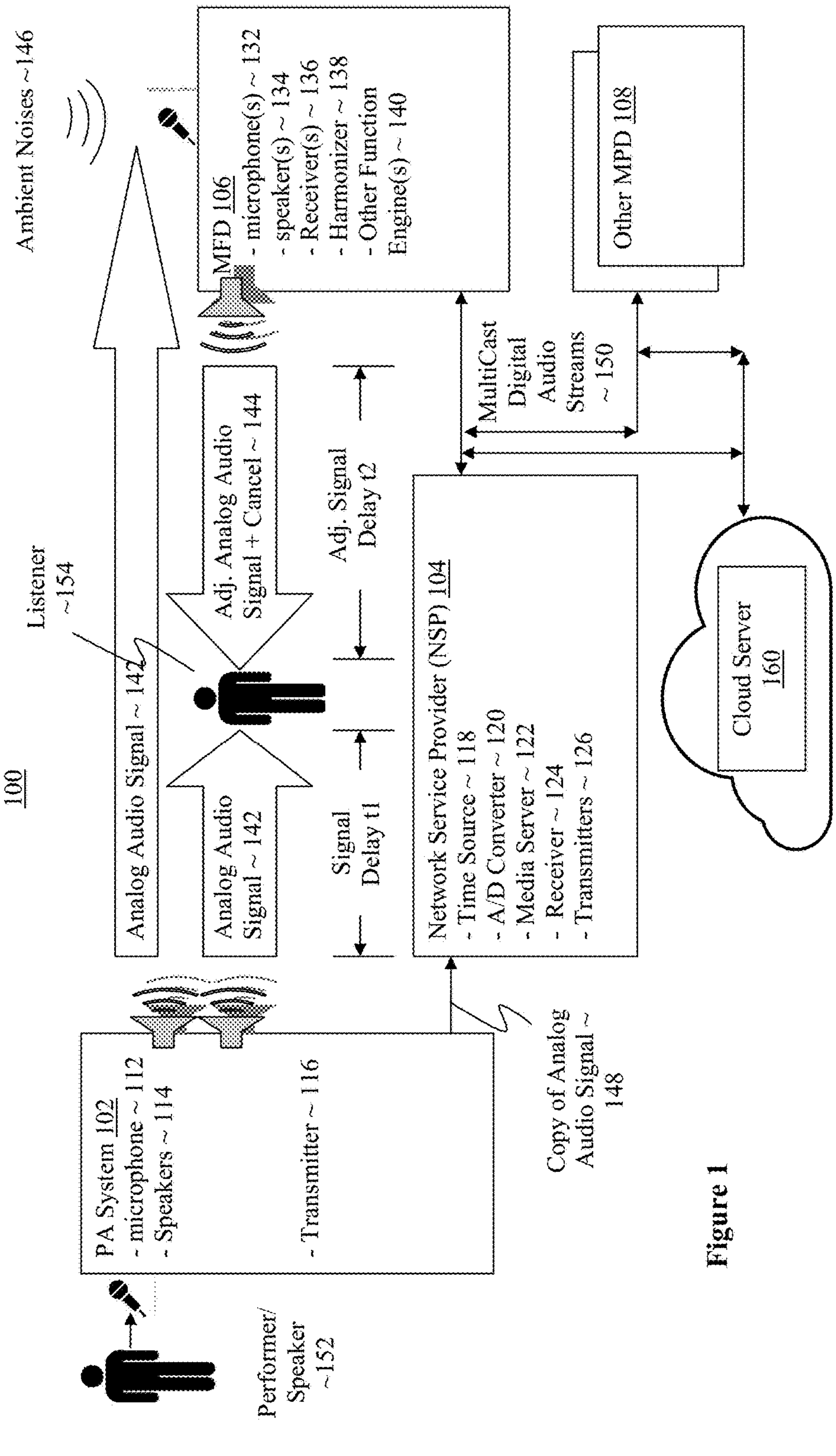
FIG. 1 illustrates a multi-function device incorporated with the analog audio signal augmentation technology of the present disclosure, in accordance with various embodiments.

Multi-function apparatuses and methods associated with augmenting an analog audio signal are disclosed herein. In embodiments, a multi-function apparatus for performing a plurality of functions, e.g., texting, calling, playing media, and so forth, may include a microphone to receive a propagated analog audio signal (e.g., from a public address system) and ambient noise; and a receiver to receive a digitally streamed version of the analog audio signal. Additionally, the multi-function apparatus may further include a harmonizer coupled to the microphone and the receiver, that includes a plurality of processors, to generate a digital adjusted version of the analog signal including noise canceling signal to cancel some or all of the ambient noise. The generation of the digital adjusted version of the analog signal may be based on the propagated analog audio signal, the ambient noise, and the digitally streamed version of the analog audio signal. Further, the apparatus may include a digital-to-analog converter coupled to the harmonizer to convert the digital adjusted version of the analog signal to an analog adjusted version of the analog signal having noise canceling signal to cancel some or all of the ambient noise. The analog adjusted version of the analog signal may then be outputted to augment the propagated analog audio signal. The augmentation being one of the plurality of functions performed, in addition to e.g., texting, calling, playing media, and so forth.

In embodiments, the generation of the digital adjusted version of the analog signal may be further based on a determined direction of the propagated analog audio signal, and/or geo-fencing information of the multi-function apparatus and/or the public address system. In embodiments, multiple multi-function apparatuses may cooperate with the public address system (or a cloud server) to respectively calibrate the multi-function apparatuses locally.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a programmable combinatorial logic circuit (such as, a field programmable gate array (FPGA)), a processor (shared, dedicated, or group) and/or memory (shared, dedicated, or group) that execute one or more software or firmware programs generated from a plurality of programming instructions, and/or other suitable components that provide the described functionality.

Referring now FIG. 1, wherein a multi-function device incorporated with analog audio signal augmentation technology of the present disclosure, in accordance with various embodiments, is illustrated. As shown, multi-function device (MFD) 106, incorporated with the analog audio signal augmentation technology of the present disclosure, may output an adjusted analog audio signal with ambient noise cancelation 144 for listener 154, to complement analog audio signal 142 propagated from public address (PA) system 102 used by performer/speaker 152. Typically, analog audio signal 142 (or reflection(s)/echo(es) of the analog audio signal 142) may arrive at listener 154 with a propagation delay of time t1. The adjusted analog audio signal with ambient noise cancelation 144 may be output by MFD 106 with delay of time t2, to complement the arrival of analog audio signal 142 (or reflection(s)/echo(es) of the analog audio signal 142), where t2 in general may be numerically smaller than t1.

As shown, PA system 102 may include microphone 112 and speakers 114. Microphone 112 may be configured to receive analog audio signals from performer/speaker 152, speaking, singing, or otherwise making sound proximally nearby. Speakers 114 may be configured to output the speaking, singing, or otherwise sound made by performer/speaker 152 as analog audio signal 142. PA system 102 may include other components, e.g., amplifiers (not shown) for amplifying the speaking, singing, or otherwise sound made by performer/speaker 152 before outputting the speaking, singing, or otherwise sound made by performer/speaker 152 as analog audio signal 142. In embodiments, PA system 102 may further include transmitter 116 to transmit a copy of the analog audio signal 148 to remote network service provider (NSP) 104. PA system 102 and remote NSP 104 may be coupled with each via one or more wired and/or wireless networks.

In embodiments, remote NSP 104 may include time source 118 (e.g., a clock), analog-to-digital (A/D) converter 120, media server 122, receiver 124, and one or more transmitters 126, coupled to each other. Receivers 124 may be configured to receive the transmitted copy of analog audio signal 148. A/D converter 116 may be configured to digitize and convert the received copy of analog audio signal 148 into digital audio signals, i.e., a digital version of analog audio signal 142. In embodiments, A/D converter 116 may include a signal sampler and a signal quantizer. The digital version of analog audio signal 142 may be timestamped in accordance with time indicated by time source 118.

Further, the timestamped digital version of analog audio signal 142 may be processed by media server 122, e.g., a codec of media server 122, and encoded into a digital audio stream. The encoded digital audio stream may in turn be outputted as multicast digital audio streams 150 through transmitter 126, to various MPD devices 106 and 108. In embodiments, NSP 104 may be communicatively coupled with MPD devices 106 and 108 via one or more wireless networks. In embodiments, NSP 104 may use some protocols to incorporate the time stamp information with multicast digital audio stream 150 (e.g., using Motion Picture Expert Group (MPEG) presentation timestamps (PTS), Real Time Protocol (RTP), and so forth). Examples of wireless technology employed to couple NSP 104, and MPD devices 106/108 may include, but are not limited to, traditional WiFi, WiFi Display (WFD), WiFi Direct Services (WFDS), or even a mesh formation of devices using near-me area network (NAN) to the backend infrastructure, as long as the introduced latency as a result of potential hops does not exceed what is required in order to synchronize the audio playback.

The choice of sampling, quantifier, compression etc. may determine the bandwidth required for streams 150, but generally, are fairly low (single to low double-digits kbit). The use of a multicast may help reduce the required bandwidth and help scale the analog audio signal augmentation technology. In embodiments, the technology may assume an open Layer 2 topology or multicast traffic leveraging a shared key (e.g., a group temporal key (GTK)). Any intermittent packets drops should not have a substantive negative impact on the overall user experience.

In embodiments, MFD 106 may include one or more microphones 132, one or more speakers 134, one or more receivers 136, harmonizer 138, and one or more other function engines 140. Microphone(s) 132 may be configured to receive analog audio signal 142 (including its reflection(s) and/or echo(es)) and ambient noises 146. Receiver(s) 136 may be configured to receive and cache multicast digital audio streams 150. Harmonizer 138 may be configured to generate adjusted analog audio signal plus ambient noise cancelation 144, based at least in part on multicast digital audio streams 150, analog audio signal 142 (including its reflection(s) and/or echo(es)) and ambient noises 146 (described more fully below, with references to FIGS. 2 and 3). In embodiments, other function engines 140 may include functions to configure/calibrate MFD 106, and to establish direction of analog audio signal 142, and/or a geo-fenced area that encompasses PA system 102 and MFD 106. For these embodiments, the configuration/calibration engine(s) 140 may cooperate with other MFDs 108, and PA system 102 or cloud server 160 to facilitate local calibration of MFD 106. Further, harmonizer 138 may generate adjusted analog audio signal plus ambient noise cancelation 144, further based on the determined direction of analog audio signal 142, and geo-fencing information. Speaker(s) 134 may be configured to output adjusted analog audio signal plus ambient noise cancelation 144. In embodiments, speaker(s) 134 may include a variety of audio output devices including, but are not limited, conventional free space audio output speakers, or ear plugs. The term speakers 134 as used herein, including the claims, may include audio ports to receive e.g., headsets, ear plugs, and so forth.

The cached digital audio streams 150 may be periodically synchronized with the analog audio signal 142, and played back on the MFD's speakers 134 (time adjusted, and/or with noise cancelation). Periodic synchronization may help avoid suboptimal user experience or adverse effect on the overall system. The introduced latency may be directly proportional to the distance of the venue's speaker(s) 114.

Other function engines 140, in addition to or in lieu of configuration/calibration of MFD 106, determination of direction of analog audio signal 142, and/or establishment of an geo-fenced area for PA system 102 and MFD 106, may be further configured to perform additional other functions, such as but are not limited to, texting, calling, playing media and so forth. In other words, MFD 106 may be, except for the analog audio signal augmentation technology, may be any one of a number of smartphones, tablets, ultrabooks, laptops, media players, cameras, and so forth. In embodiments, MFD 106 may further include other components, e.g., amplifiers to amplify adjusted analog audio signal plus ambient noise cancelation 144 before it is output by speakers 134. Example embodiments of MFD 106 are described further below with references to FIG. 2.

Similarly, except for its usage, in particular, its analog audio signal 142 being augmented to enhance the listening experience of listener 154, PA system 102 may be any one of a number of PA systems known in the art. Similarly, except for its usage, in particular, its receipt of the copy of analog audio signal 148, and the multicasting of digital audio streams 150, NSP 104 may be any one of a number of NSP systems known in the art.

In embodiments, as described earlier, PA system 102 and MFD 106 and 108 may be configured to cooperate to facilitate respective local calibration of MFD 106 and 108 for the generation and output of adjusted analog audio signal plus cancelation 144. In still other embodiments, cloud server 160 (in lieu of PA system 102) and MFD 106 and 108 may be configured to cooperate to facilitate respective local calibration of MFD 106 and 108 for the generation and output of adjusted analog audio signal plus cancelation 144. Cloud server 160, except for its cooperation with MFD 106 and 108, may be any one of a known of cloud servers known in the art.

Figure 2:
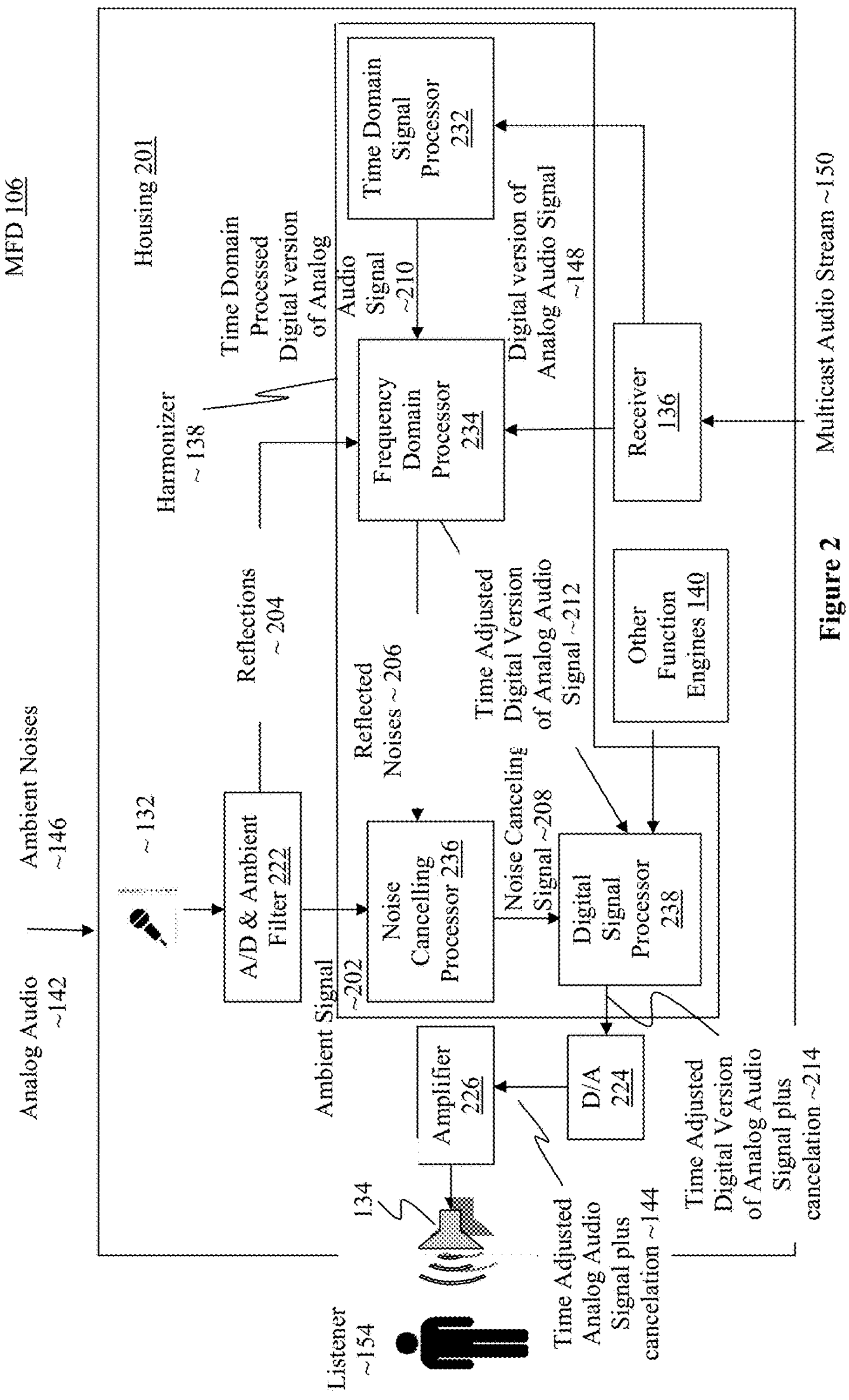
FIG. 2 illustrates the multi-function device in further detail, in accordance with various embodiments.

Referring now to FIG. 2, wherein an example multi-function device in further detail, in accordance with various embodiments, is shown. As illustrated, MFD 106, as described earlier, may include one or more microphones 132, one or more speakers 134, one or more receivers 136, and harmonizer 138, coupled with each other as shown. Additionally, MFD 106 may include analog-to-digital (A/D) converter and ambient filer 222, digital-to-analog (D/A) converter 224, amplifier 226, and one or more other function engines 140 coupled with each other and the earlier described elements as shown. Further, MFD 106 may include housing 201 to house the aforementioned and other elements. In embodiments, housing 201 may have dimensions selected for portability or mobility of MFD 106.

Harmonizer 138 may include time domain signal processor 232, frequency domain processor 234, noise cancelation processor 236 and digital signal processor 238, coupled with each other as shown. A/D converter and ambient filter 222 may be configured to receive analog audio signal 142 (including its reflection(s) and echo(es)) and ambient noises 146 via microphone 132. A/D converter and ambient filter 222 may digitize and filter analog audio signal 142 (including its reflection(s) and echo(es)) and ambient noises 146 to generate ambient signal 202, and reflection signals 204 of analog audio signal 142. Ambient signal 202 may be provided to noise canceling processor 236, and reflection signals 204 of analog audio signal 142 may be provide to frequency domain processor 234.

At the other end, receiver 136 may be configured to receive multicast audio streams 150, and output digital version of the analog audio signal 148 for time domain signal processor 232. Time domain signal processor 232 may be configured to receive digital version of the analog audio signal 148, on calibration, perform processing in time domain on digital version of the analog audio signal 148, and output processed digital version of analog audio signal 210.

In embodiments, multicast audio streams 150 may be streamed in accordance with Real Time Streaming Protocol (RTSP), Real-time Transport Protocol (RTP), or Real-time Control Protocol (RTCP). In general, on receipt, data may be quantized into a digital representation that may be expressed as a "fixed point" or "floating point" format. Processors 232, 234 and 238 may be configured to operate on one or both formats. Once data are formatted various processing by processors 232, 234, 238 may be applied.

Recall NSP 104 may use some protocol to incorporate the time stamp information with broadcast audio streams 150, to facilitate processing in time domain. In embodiments, MFD 106 may synchronize its local clock to a time server (e.g., using Network Time Protocol (NTP)). MFD 106 may synchronize its local clock periodically. The periodicity may depend on the level of accuracy required in terms of audio lag, clock drift etc. In embodiments, local calibration may be performed to compensate for internal variances and/or delays introduced in the software layers of MFD 106. In embodiments, hardware supported time functions may be leveraged to achieve the desired synchronization.

In embodiments, the processing in time domain may compensate for the propagation of sound, which may otherwise result in echoes, as the distance between speakers 114 of PA system 102 and MFD 106 increases. Local calibration may be performed based on geo-fencing information and location determination of MFD 106 (e.g., triangulation of the location MFD 106 using surrounding wireless transceivers, fingering, or other location/proximity based technology). Local calibration of MFD 106, including cooperation with PA system 102 or cloud server 160, and other MFDs 108, will be further described below with references to FIG. 6.

Frequency domain processor 234 may be configured to receive reflection signals 204 of analog audio signal 142 and time domain processed digital version of analog audio signal 210, on calibration, perform processing in frequency domain on reflection signals 204 of analog audio signal 142 and time domain processed digital version of analog audio signal 210, to output reflected noises 206, and time adjusted digital version of analog audio signal 212 for noise canceling processor 236 and digital signal processor 238 respectively.

In embodiments, when processing the signal in the frequency domain, an explicit time service on the network or time stamping the audio stream periodically may not be required. Instead signal processing techniques may be employed to correlate audio streams 150 received over the wireless medium with analog audio signal 142 (and its reflection(s) or echo(es)). MFD 106 may record and digitize analog audio signal 142 (including its reflection(s) or echo(es)) from PA system 102 received through microphone 132.

Both audio streams 150 and analog audio signal 142 may be converted to the frequency domain using discrete fast Fourier transform (DFFT) with some predefined set of samples (window length) that can be created prior to being transformed and then correlated. The time alignment between the signals may be determined to calibrate the playback of the adjusted analog audio signal plus cancelation 144. Any one of a number signal processing algorithms may be employed to determine the strongest correlation of audio streams 150 and analog audio signal 142 (direct or one of the reflection(s)/echo(es)). In embodiments, an algorithm may analyze the Mel-frequency cepstral coefficients (MFCCs) of the audio signals for determination of similarity and synchronization. The MFC may be a representation of the short-term power spectrum of a sound, based on a linear cosine transform of a log power spectrum on a nonlinear mel scale of frequency. The cosine waves of the audio signals may be compared and phase shifted (as needed) to align with each other.

Processing audio streams 150 and analog audio signal 142 in the frequency domain may have additional benefits, as continuous processing of the signals may allow for noise cancellation and artifact elimination possible by altering analog audio signal 142 (to counteract acoustic artifacts received over PA system 102 in analog audio signal 142).

In embodiments, frequency domain analysis may be further improved by applying DFFT to both direct and reflected versions of analog audio signal 142. Ideally, the most prominent two or three reflected versions of analog audio signal 142 may have DFFT applied in parallel. These reflected versions may be compared with digital audio streams 150 arriving wirelessly to identify the strongest analog audio signal 142 (whether it is direct or a refection). Once a primary version of analog audio signal 142 is selected, the secondary (weaker) versions of analog audio signal 142 may be inputted to noise cancelling processor 236.

In embodiments, time domain analysis may be used to quickly identify the direct versus reflected versions of analog audio signal 142. Hence a combination of both processing in time and frequency domains may have additional benefit.

Noise canceling processor 236 may be configured to receive ambient signal 202 and reflected noises 206, perform noise canceling operation on ambient signal 202 and reflected noises 206, to output noise canceling signal 208 for digital signal processor 238. Digital signal processor 238 may be configured to receive noise canceling signal 208 and time adjusted digital version of analog audio signal 212, and perform digital signal processing operation on noise canceling signal 208 and time adjusted digital version of analog audio signal 212, to combine the signals to produce time adjusted digital version of analog audio signal plus noise cancelation 214. In embodiments, digital signal processor 238 may be further configured to receive directional information about analog audio signal 142, and/or geo-fencing information about PA system 102 and MFD 106 from other function engines 140. For these embodiments, digital signal processor 238 may produce time adjusted digital version of analog audio signal plus noise cancelation 214 further based on the directional information about analog audio signal 142, and/or the geo-fencing information about PA system 102 and MFD 106.

D/A converter 224 may be configured to convert time adjusted digital version of analog audio signal plus noise cancelation 214, and output time adjusted analog audio signal plus noise cancelation 144. Amplifier 226 may be configured to amplify time adjusted analog audio signal plus noise cancelation 144 for output by speakers 134 for listener 154. Recall time adjusted analog audio signal plus noise cancelation 144 may be time delayed by t2 to coincide with the propagated arrival of analog audio signal 142 having a propagation time delay of t1. The timed arrival with noise cancelation canceling ambient noises 146 may enhance the listening experience of listener 154.

In embodiments, if the dynamics of the acoustical environment change (e.g., shifting cloud cover in an outdoor arena), harmonizer 138 may identify the stronger (e.g., reflected) signal, process it, then re-sync the digital broadcast signal to delay (as appropriate) before amplifying it to the user. Other conditions that may affect the dynamics of sound may include changes in air density (temperature, humidity, wind speed); changes in physical dimension in the listening area (bleacher configuration, people/population changes, positioning of PA speakers (mobile) 114, dynamics of other speakers 134 near the target listener 154. Harmonizer 138 may identify the stronger (e.g., reflected) signal, process it, then re-sync the digital broadcast signal to delay (as appropriate) before amplifying it to the user, taking into consideration changes in one or more of these environmental factors.

Figure 3:
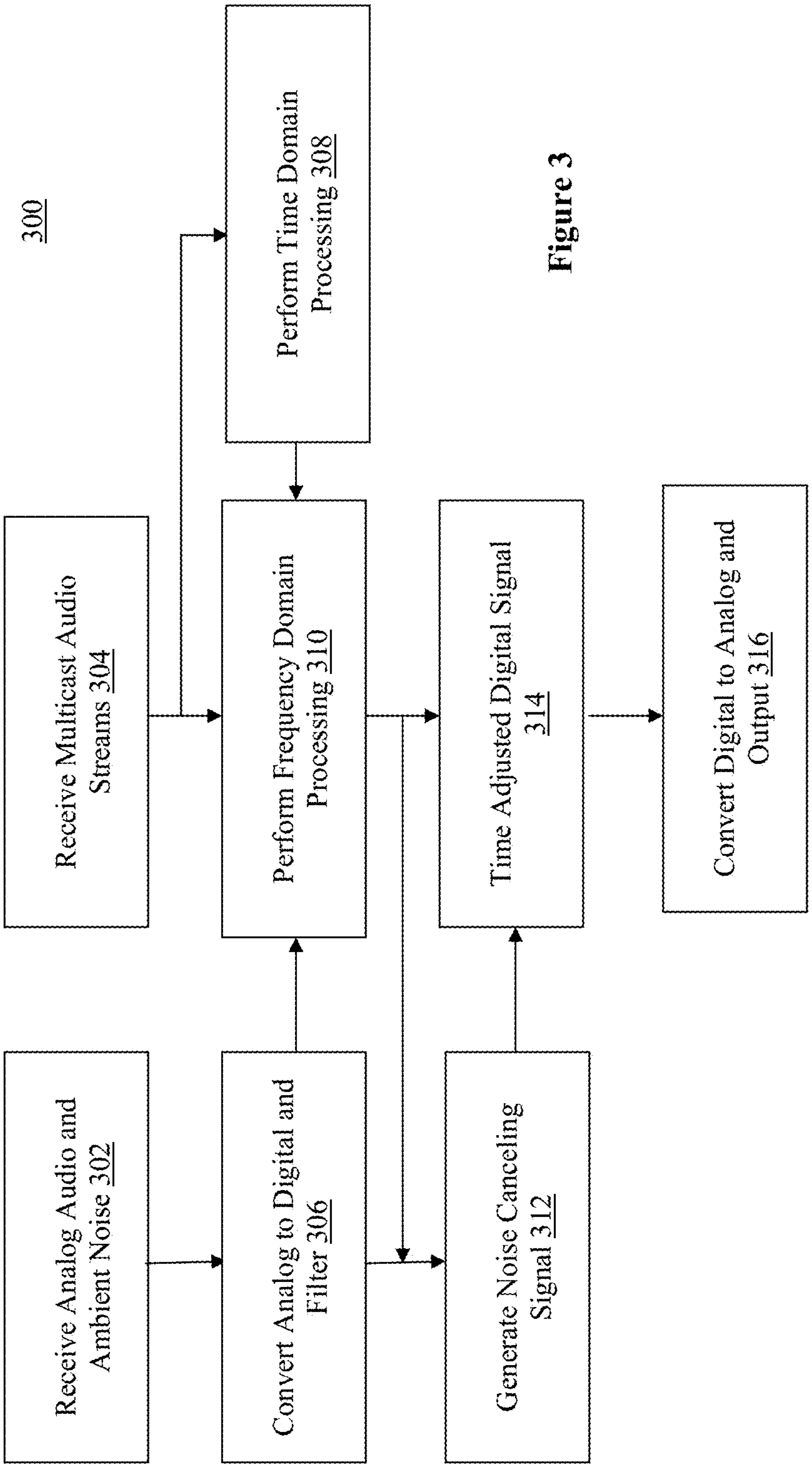
FIG. 3 illustrates an overview of the operational flow of a process for augmenting analog audio signal, in accordance with various embodiments.

Referring now FIG. 3, wherein an overview of the operational flow of a process for augmenting analog audio signal, in accordance with various embodiments, is shown. As illustrated, process 300 may include operations performed at blocks 302-316. The operations may be performed e.g., by the various elements of MFD 106 earlier described with references to FIGS. 1 and 2.

Process 300 may begin at blocks 302 and 304. At block 302, an analog audio signal (including its reflection(s) or echo(es)) and ambient noises may be received. At block 304, multicast audio streams having a digital version of the analog audio signal may be received.

From block 302, process 300 may proceed to block 306, where the analog audio signal including its reflection(s) or echo(es)) and ambient noises may be digitized and filtered to generate an ambient signal and reflection signals of the analog audio signal. From block 306, process 300 may proceed to block 310 and block 312.

From block 304, process 300 may proceed to block 308 and 310. At block 308, processing in time domain may be performed on the digital version of the analog audio signal, to generate a time domain processed digital version of the analog audio signal. At block 310, processing in frequency domain may be performed on the reflection signals and time adjusted version the digital version of the analog audio signal to generate reflected noises and time adjusted digital version of the analog audio signal.

From block 310, process 300 may proceed to block 312 and block 314. At block 312, noise canceling signal may be generated. Thereafter, at block 314, the time adjusted digital version of the analog audio signal with cancelation may be generated. In embodiments, the time adjusted digital version of the analog audio signal with cancelation may be generated based further on a determined direction of analog audio signal 142 and geo-fencing information of PA system 102 and MFD 106.

From block 314, process 300 may proceed to block 316. At block 316, the time adjusted digital version of the analog audio signal with cancelation may be converted to a time adjusted analog audio signal with cancelation. Next, the time adjusted analog audio signal with cancelation may be outputted to complement the propagated analog audio signal, to enhance the listening experience of the listener.

Figure 6:
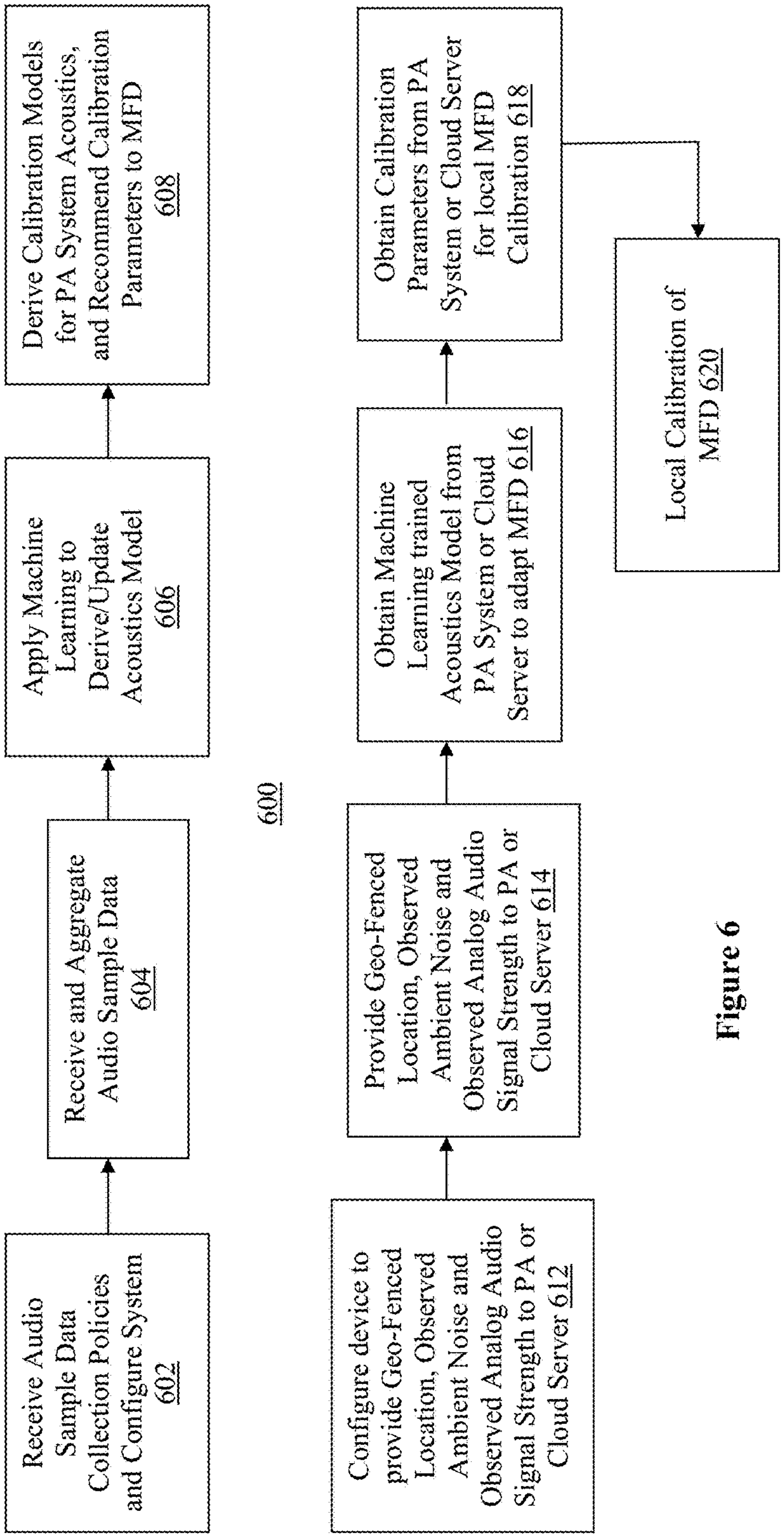
FIG. 6 illustrates a process for calibrating a multi-function device, in accordance with various embodiments.

Referring now to FIG. 6, wherein a process for respective local configuration of the MFDs, is illustrated. As shown, process 600 for respective local configuration of the MFDs 106 and 108 may be a crowd-sourced process with MFDs 106 and 108 cooperating with PA system 102 (or cloud server 160). In embodiments, process 600 may include operations performed at blocks 602-608, and operations performed at blocks 612-620. Operations at blocks 602-608 may be performed by e.g., PA System 102 or cloud server 160, whereas operations at blocks 612-620 may be performed by the individual MFDs 106 and 108. While for ease of understanding, the operations will be described in groups and in certain order, however, the present disclosure is not to be so limited. The operations may be further grouped or divided, and/or in some cases, perform in different order.

The PA system or cloud server portion of process 600 may begin at block 602. At block 602, audio sample data collection policies may be received (e.g., by PA system 102 or cloud server 160). The receiving system may be configured to operate in accordance with the policies. Next, at block 604, audio sample data may be received from the various MFDs in accordance with the policies (e.g., periodically or on demand). On receipt, the audio sample data may be aggregated. In embodiments, other associated data, such as, but not limited to geo-fencing data, ambient noises, and so forth, may also be received from the MFDs in accordance with the policies.

At block 606, machine learning may be applied to the aggregated audio sample (and associated) data to derive an acoustic model for the venue (or geo-fenced area) where PA system 102 and MFD 106 and 108 are located, or derive updates to a previously derived acoustic model (to reflect e.g., the changing conditions in the venue/geo-fenced area). At block 608, calibration models for the PA system acoustics, including calibration parameter recommendations for the MFD may be generated, and subsequently provided to the MFDs (e.g., in response to requests from the MFDs).

Still referring to FIG. 6, the MFD portion of process 600 (performed at each MFD) may begin at block 612. At block 612, an MFD may configure itself to provide observed analog audio signal strength and other related data (such as, geo-fencing, ambient noise, and so forth) to either PA system 102 or cloud server 160, in accordance with the same policies. Each MFD may be similarly provided with the policies. Next at block 614, on configuration, the MFD may provide observed analog audio signal strength and other related data (such as, geo-fencing, ambient noise, and so forth) to either PA system 102 or cloud server 160.

At block 616, the MFD may obtain machine learning trained acoustics model from either PA system 102 or cloud server 160. On receipt, the machine learning trained acoustics model may be subsequently used to adapt the MFD. At block 618, the MFD may further obtain calibration parameter recommendations from either PA system 102 or cloud server 160. At block 620, on receipt of both the machine learning trained acoustics model and calibration parameter recommendations, local calibration of the MFD may be performed.

Figure 4:
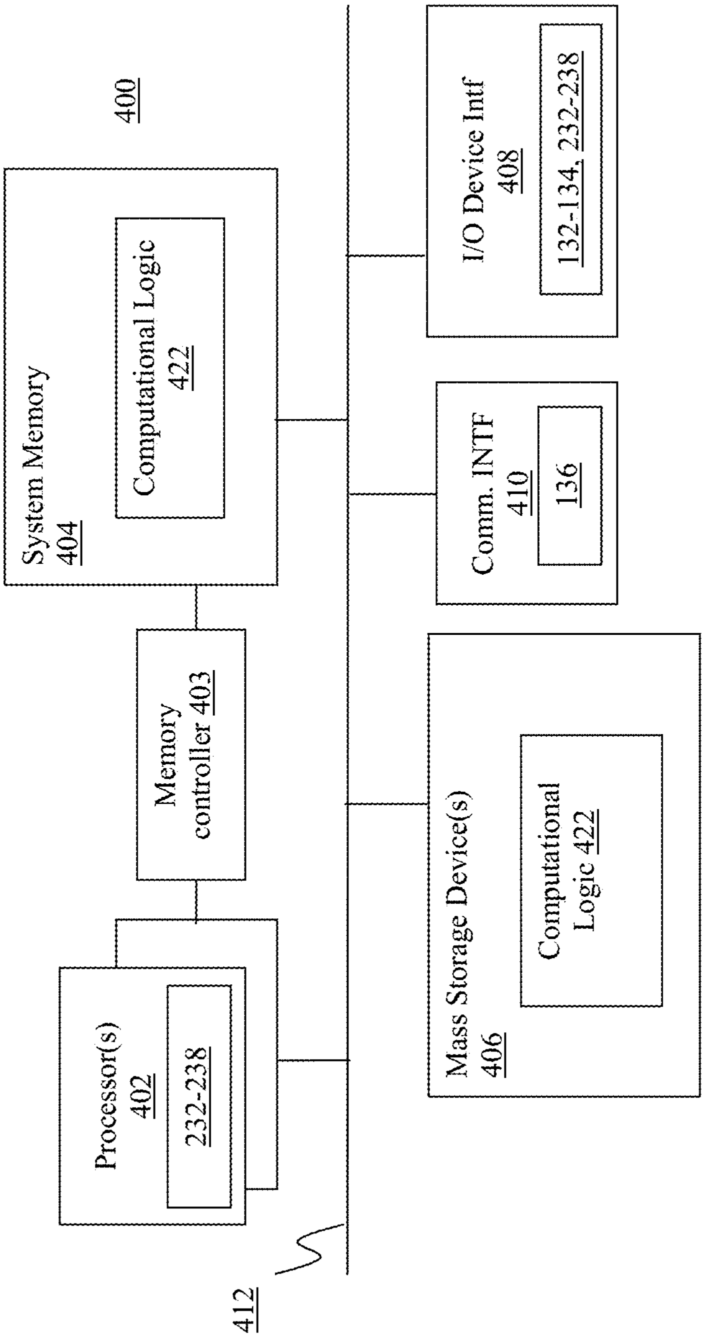
FIG. 4 illustrates a computing system suitable for practicing aspects of the present disclosure, in accordance with various embodiments.

Referring now to FIG. 4, wherein a block diagram of a computer device suitable for practice the present disclosure, in accordance with various embodiments, is illustrated. As shown, computer device 400 may include one or more processors 402, memory controller 403, and system memory 404. Each processor 402 may include one or more processor cores. One or more processors 402 may include one or more of processors 232-238, earlier described with references to FIG. 2. Memory controller 403 may be any one of a number of memory controllers known in the art. System memory 404 may include any known volatile or non-volatile memory.

Additionally, computer device 400 may include mass storage device(s) 406 (such as solid state drives), input/output (I/O) device interface 408 (to interface with various input/output devices, such as, mouse, cursor control, display device (including touch sensitive screen), and so forth). In embodiments, and communication interfaces 410 (such as network interface cards, modems and so forth). In embodiments, I/O device interface 408 may include I/O elements 132-134 and/or one or more processors 232-238, earlier described with references to FIGS. 1-2. In embodiments, communication interfaces 410 may support wired or wireless communication, including near field communication. Communication interfaces 410 may include in particular receiver 136 earlier described with references to FIGS. 1-2. The elements may be coupled to each other via system bus 412, which may represent one or more buses. In the case of multiple buses, they may be bridged by one or more bus bridges (not shown).

Each of these elements may perform its conventional functions known in the art. In particular, system memory 404 and mass storage device(s) 406 may be employed to store a working copy and a permanent copy of the executable code of the programming instructions of an operating system, one or more applications, and/or one or more software implementations of other function engines 140, and/or processors 232-236 described earlier with references to FIGS. 1 & 2, collectively referred to as computing logic 422. Software implementations of other function engines 140, and/or processors 232-236 may be configured to practice (aspects of) process 300 of FIG. 3. The programming instructions may comprise assembler instructions supported by processor(s) 702 or high-level languages, such as, for example, C, that can be compiled into such instructions.

The permanent copy of the executable code of the programming instructions may be placed into permanent mass storage device(s) 406 in the factory, or in the field, through, for example, a distribution medium (not shown), such as a compact disc (CD), or through communication interface 410 (from a distribution server (not shown)).

The number, capability and/or capacity of these elements 410-412 may vary, depending on the intended use of example computer device 400, e.g., whether example computer device 400 is a smartphone, a tablet, an ultrabook, a laptop, a media player, a camera, and so forth. The constitutions of these elements 410-412 are otherwise known, and accordingly will not be further described.

Figure 5:
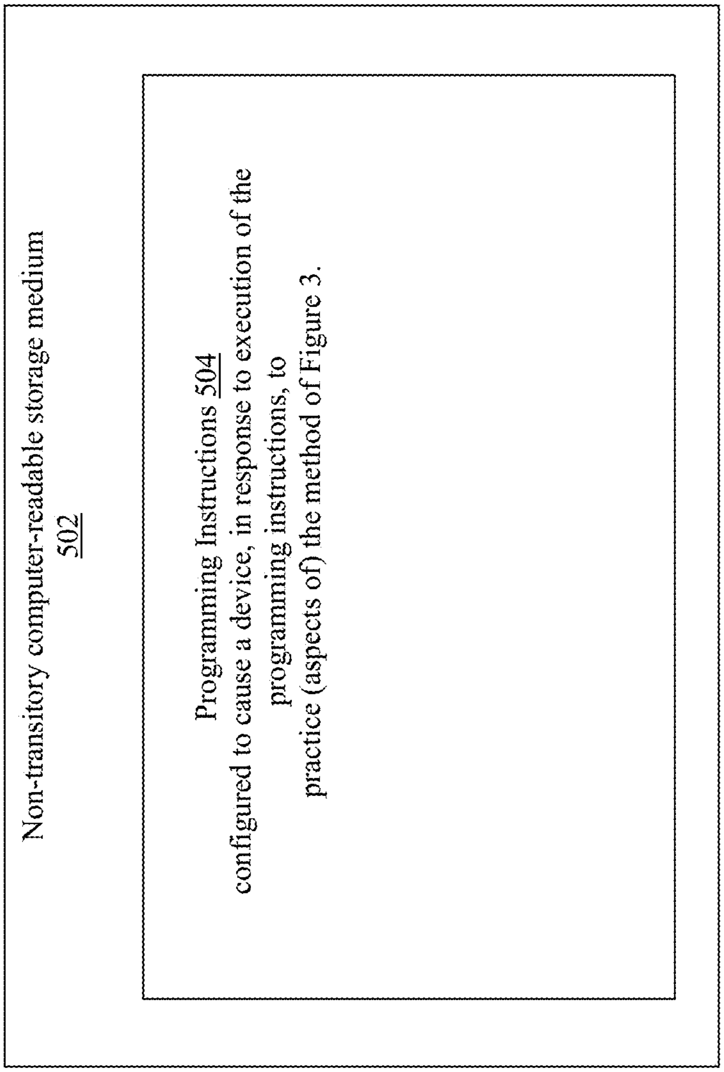
FIG. 5 illustrates an example computer-readable storage medium having instructions configured to practice (aspects of) process 300 of FIG. 3, in accordance with various embodiments.

FIG. 5 illustrates an example computer-readable storage medium having instructions configured to practice (aspects of) process 300 of FIG. 3, earlier described, in accordance with various embodiments. As illustrated, computer-readable storage medium 502 may include the executable code of a number of programming instructions 504. Executable code of programming instructions 504 may be configured to enable a device, e.g., computer device 400, in response to execution of the executable code/programming instructions, to perform (aspects of) process 300 of FIG. 3, e.g., operations performed by software implementations of other function engines 140, and/or processors 232-236. In alternate embodiments, executable code/programming instructions 504 may be disposed on multiple non-transitory computer-readable storage medium 502 instead. In embodiments, computer-readable storage medium 502 may be non-transitory. In still other embodiments, executable code/programming instructions 504 may be encoded in transitory computer readable medium, such as signals.

Referring back to FIG. 4, for one embodiment, at least one of processors 402 may be packaged together with a computer-readable storage medium having some or all of computing logic 422 (in lieu of storing in system memory 404 and/or mass storage device 406) configured to practice all or selected ones of the operations earlier described with references to FIG. 3. For one embodiment, at least one of processors 402 may be packaged together with a computer-readable storage medium having some or all of computing logic 422 to form a System in Package (SiP). For one embodiment, at least one of processors 402 may be integrated on the same die with a computer-readable storage medium having some or all of computing logic 422. For one embodiment, at least one of processors 402 may be packaged together with a computer-readable storage medium having some or all of computing logic 422 to form a System on Chip (SoC). For at least one embodiment, the SoC may be utilized in, e.g., but not limited to, a hybrid computing tablet/laptop.

Example 1 may be a multi-function portable apparatus for performing a plurality of functions, comprising: a microphone to receive a propagated analog audio signal and ambient noise; a receiver to receive a digitally streamed version of the analog audio signal; a harmonizer coupled to the microphone and the receiver, that includes a plurality of processors, to generate a digital adjusted version of the analog signal including noise canceling signal to cancel some or all of the ambient noise, based on the propagated analog audio signal, the ambient noise, and the digitally streamed version of the analog audio signal; and a digital-to-analog converter coupled to the harmonizer to convert the digital adjusted version of the analog signal to an analog adjusted version of the analog signal having noise canceling signal to cancel some or all of the ambient noise; wherein the analog adjusted version of the analog signal having noise canceling signal is outputted to augment the propagated analog audio signal, the augmentation being one of the plurality of functions.

Example 2 may be example 1, wherein the analog adjusted version of the analog signal may be time adjusted to arrive at a listener associated with the multi-function portable apparatus, at proximately a same time as the propagated analog audio signal.

Example 3 may be example 1, wherein the harmonizer may include an analog-to-digital converter-filter coupled to the microphone to digitize and filter the received propagated analog audio signal to generate and output a digital ambient signal and one or more digital reflection signals of the propagated analog audio signal.

Example 4 may be example 3, wherein the plurality of processors of the harmonizer may include a noise canceling processor coupled to the analog-to-digital converter-filter to process the digital ambient signal and to generate and output a digital canceling signal to cancel the ambient noise signal.

Example 5 may be example 3, wherein the plurality of processors of the harmonizer may further include a frequency domain processor coupled to the analog-to-digital converter-filter to process in frequency domain the digital reflection signal, and to generate and output a digital reflected noise signal.

Example 6 may be example 5, wherein the frequency domain processor may perform discrete fast Fourier transform on the digital reflection signal.

Example 7 may be example 5, wherein the noise canceling processor may further generate and output the digital canceling signal based on the reflected noise signal.

Example 8 may be example 5, wherein the plurality of processors of the harmonizer may further include a time domain processor coupled to the receiver and the frequency domain processor, to process in time domain the digitally streamed version of the analog audio signal, to generate a time domain processed digital version of the analog audio signal, and to provide the time domain processed digital version of the analog audio signal to the frequency domain processor; wherein the frequency domain processor may further generate and output the digital reflected noise signal based on the time domain processed digital version of the analog audio signal.

Example 9 may be example 3, wherein the plurality of processors of the harmonizer may further include: a noise canceling processor coupled to the analog-to-digital converter-filter to process the digital ambient signal and to generate and output a digital canceling signal to cancel the ambient noise signal; a frequency domain processor coupled to the analog-to-digital converter-filter to process in frequency domain the digital reflection signal, and to generate and output a digital time adjusted version of the analog signal; and a digital signal processor coupled to the noise canceling processor, and the frequency domain processor to process in frequency domain the digital canceling signal and the digital time adjusted version of the analog signal, and to generate and output the digital adjusted version of the analog signal including noise canceling signal to cancel some or all of the ambient noise.

Example 10 may be example 9, wherein the frequency domain processor may further generate and output a digital reflected noise signal; and the noise canceling processor may further generate and output the digital canceling signal based on the reflected noise signal.

Example 11 may be example 10, wherein the plurality of processors of the harmonizer may further include a time domain processor coupled to the receiver and the frequency domain processor, to process in time domain the digitally streamed version of the analog audio signal, to generate a time domain processed digital version of the analog audio signal, and to provide the time domain processed digital version of the analog audio signal to the frequency domain processor; wherein the frequency domain processor may further generate and output the digital reflected noise signal based on the time domain processed digital version of the analog audio signal.

Example 12 may be any one of examples 1-11, further comprising a function engine to perform another function, in addition to or to complement the generation of the analog adjusted version of the analog signal having noise canceling signal.

Example 13 may be example 12, wherein one or more of the processors of the harmonizer may be implemented in an application specific integrated circuit or a programmable circuit.

Example 14 may be example 12, wherein the multi-function portable apparatus may further comprise a housing to house the microphone, the receiver, the harmonizer and the digital-to-analog converter, with the housing having dimensions selected for portability of the multi-function portable apparatus.

Example 15 may be example 12, wherein the multi-function portable apparatus may be a wearable device, a smartphone, a computing tablet, a notebook computer, a laptop computer, or a media player.

Example 16 may be example 12, wherein the function engine may play media, or facilitate a user of the multi-function portable apparatus to call or text another user of another apparatus.

Example 17 may be example 12, wherein the function engine may establish a geo-fenced area having the multi-function portable apparatus and a source of the analog audio signal.

Example 18 may be example 12, wherein the function engine may cooperate with a source of the analog audio signal or a cloud server, to receive an acoustics model of a venue or area having at least the multi-function portable apparatus and the source, or calibration parameter recommendations, and to calibrate the multi-function portable apparatus, based at least in part on the received acoustics model or calibration parameter recommendations.

Example 19 may be example 12, the function engine may send sample data of the analog audio signal or ambient noise to a source of the analog audio signal or a cloud server.

Example 20 may be a method for augmenting a propagated analog audio signal, comprising: receiving, with a multi-function portable apparatus, the propagated analog audio signal and ambient noise; receiving, with the multi-function portable apparatus, a digitally streamed version of the analog audio signal; generating, with the multi-function portable apparatus, a digital adjusted version of the analog signal including noise canceling signal to cancel some or all of the ambient noise, based on the propagated analog audio signal and ambient noise, and the digitally streamed version of the analog audio signal; converting, with the multi-function portable apparatus, the digital adjusted version of the analog signal to an analog adjusted version of the analog signal having noise canceling signal to cancel some or all of the ambient noise; and outputting, with the multi-function portable apparatus, the analog adjusted version of the analog signal to augment the propagated analog audio signal.

Example 21 may be example 20, wherein the analog adjusted version of the analog signal is time adjusted to arrive at a listener associated with the multi-function portable apparatus, at proximately a same time as the propagated analog audio signal.

Example 22 may be example 20, wherein generating may comprise digitizing and filtering the received propagated analog audio signal to generate and output a digital ambient signal and one or more digital reflection signals of the propagated analog audio signal.

Example 23 may be example 22, wherein generating may comprise processing the digital ambient signal to generate and output a digital canceling signal to cancel the ambient noise signal.

Example 24 may be example 22, wherein generating may comprise processing in frequency domain the digital reflection signal to generate and output a digital reflected noise signal.

Example 25 may be example 24, wherein processing in frequency domain may comprise performing discrete fast Fourier transform on the digital reflection signal.

Example 26 may be example 24, wherein generating may further comprise generating and outputting the digital canceling signal based on the reflected noise signal.

Example 27 may be example 24, wherein generating may comprise processing in time domain the digitally streamed version of the analog audio signal to generate a time domain processed digital version of the analog audio signal, wherein processing in frequency domain may further comprise generating and outputting the digital reflected noise signal based on the time domain processed digital version of the analog audio signal.

Example 28 may be example 22, wherein generating may further include:

processing the digital ambient signal and to generate and output a digital canceling signal to cancel the ambient noise signal;

processing in frequency domain the digital reflection signal to generate and output a digital time adjusted version of the analog signal; and processing in frequency domain the digital canceling signal and the digital time adjusted version of the analog signal to generate and output the digital adjusted version of the analog signal including noise canceling signal to cancel some or all of the ambient noise.

Example 29 may be example 28, wherein generating may further comprise generating and outputting a digital reflected noise signal; and to generate and output the digital canceling signal is further based on the reflected noise signal.

Example 30 may be example 29, wherein generating may comprise processing in time domain the digitally streamed version of the analog audio signal to generate a time domain processed digital version of the analog audio signal, wherein generating and outputting the digital reflected noise signal is further based on the time domain processed digital version of the analog audio signal.

Example 31 may be any one of examples 20-30, further comprising establishing a geo-fenced area having the multi-function portable apparatus and a source of the analog audio signal.

Example 32 may be any one of examples 20-30, further comprising cooperating with a source of the analog audio signal or a cloud server, to receive an acoustics model of a venue or area having at least the multi-function portable apparatus and the source, or calibration parameter recommendations, and calibrating the multi-function portable apparatus, based at least in part on the received acoustics model or calibration parameter recommendations.

Example 33 may be any one of examples 20-30, further comprising sending sample data of the analog audio signal or ambient noise to a source of the analog audio signal or a cloud server.

Example 34 may be one or more computer-readable medium (CRM) having instructions to cause a multi-function portable apparatus, in response to the execution of the instructions by one or more processors of the multi-function portable apparatus, to: receive a propagated analog audio signal and ambient noise; receive a digitally streamed version of the analog audio signal; generate a digital adjusted version of the analog signal including noise canceling signal to cancel some or all of the ambient noise, based on the propagated analog audio signal and ambient noise, and the digitally streamed version of the analog audio signal; convert the digital adjusted version of the analog signal to an analog adjusted version of the analog signal having noise canceling signal to cancel some or all of the ambient noise; and output the analog adjusted version of the analog signal to augment the propagated analog audio signal.

Example 35 may be example 34, wherein the analog adjusted version of the analog signal may be time adjusted to arrive at a listener associated with the multi-function portable apparatus, at proximately a same time as the propagated analog audio signal.

Example 36 may be example 34, wherein to generate may comprise to digitize and filter the received propagated analog audio signal to generate and output a digital ambient signal and one or more digital reflection signals of the propagated analog audio signal.

Example 37 may be example 36, wherein to generate may comprise to process the digital ambient signal and to generate and output a digital canceling signal to cancel the ambient noise signal.

Example 38 may be example 36, wherein to generate may comprise to process in frequency domain the digital reflection signal, and to generate and output a digital reflected noise signal.

Example 39 may be example 38, wherein to process in frequency domain may comprise to perform discrete fast Fourier transform on the digital reflection signal.

Example 40 may be example 38, wherein to generate may comprise to further generate and output the digital canceling signal based on the reflected noise signal.

Example 41 may be example 38, wherein to generate may comprise to process in time domain the digitally streamed version of the analog audio signal to generate a time domain processed digital version of the analog audio signal, wherein to process in frequency domain may further comprise to generate and output the digital reflected noise signal based on the time domain processed digital version of the analog audio signal.

Example 42 may be example 38, wherein to generate may comprise: to process the digital ambient signal and to generate and output a digital canceling signal to cancel the ambient noise signal; to process in frequency domain the digital reflection signal, and to generate and output a digital time adjusted version of the analog signal; and to process in frequency domain the digital canceling signal and the digital time adjusted version of the analog signal, and to generate and output the digital adjusted version of the analog signal including noise canceling signal to cancel some or all of the ambient noise.

Example 43 may be example 42, wherein to process in frequency domain may further comprise to generate and output a digital reflected noise signal; and to generate and output the digital canceling signal is further based on the reflected noise signal.

Example 44 may be example 43, wherein to generate may comprise to process in time domain the digitally streamed version of the analog audio signal to generate a time domain processed digital version of the analog audio signal, wherein to process in frequency domain may further generate and output the digital reflected noise signal based on the time domain processed digital version of the analog audio signal.

Example 45 may be any one of examples 34-44, wherein the multi-function portable apparatus may be further caused to establish a geo-fenced area having the multi-function portable apparatus and a source of the analog audio signal.

Example 46 may be any one of examples 34-44, wherein the multi-function portable apparatus may be further caused to cooperate with a source of the analog audio signal or a cloud server, to receive an acoustics model of a venue or area having at least the multi-function portable apparatus and the source, or calibration parameter recommendations, and to calibrate the multi-function portable apparatus, based at least in part on the received acoustics model or calibration parameter recommendations.

Example 47 may be any one of examples 34-44, wherein the multi-function portable apparatus may be further caused to send sample data of the analog audio signal or ambient noise to a source of the analog audio signal or a cloud server.

Example 48 may be a multi-function portable apparatus for performing a plurality of functions, comprising: means for receiving the propagated analog audio signal and ambient noise; means for receiving a digitally streamed version of the analog audio signal;

means for generating a digital adjusted version of the analog signal including noise canceling signal to cancel some or all of the ambient noise, based on the propagated analog audio signal and ambient noise, and the digitally streamed version of the analog audio signal; means for converting the digital adjusted version of the analog signal to an analog adjusted version of the analog signal having noise canceling signal to cancel some or all of the ambient noise; and means for outputting the analog adjusted version of the analog signal to augment the propagated analog audio signal, the augmentation being one of the plurality of functions.

Example 49 may be example 48, wherein the analog adjusted version of the analog signal may be time adjusted to arrive at a listener associated with the multi-function portable apparatus, at proximately a same time as the propagated analog audio signal.

Example 50 may be example 48, wherein means for generating may comprise means for digitizing and filtering the received propagated analog audio signal to generate and output a digital ambient signal and one or more digital reflection signals of the propagated analog audio signal.

Example 51 may be example 50, wherein means for generating may comprise means for processing the digital ambient signal to generate and output a digital canceling signal to cancel the ambient noise signal.

Example 52 may be example 50, wherein means for generating may comprise means for processing in frequency domain the digital reflection signal to generate and output a digital reflected noise signal.

Example 53 may be example 52, wherein means for processing in frequency domain may comprise means for performing discrete fast Fourier transform on the digital reflection signal.

Example 54 may be example 52, wherein means for generating may further comprise means for generating and outputting the digital canceling signal based on the reflected noise signal.

Example 55 may be example 52, wherein means for generating may comprise means for processing in time domain the digitally streamed version of the analog audio signal to generate a time domain processed digital version of the analog audio signal, wherein means for processing in frequency domain may further comprise means for generating and outputting the digital reflected noise signal based on the time domain processed digital version of the analog audio signal.

Example 56 may be example 50, wherein means for generating may further include: means for processing the digital ambient signal and to generate and output a digital canceling signal to cancel the ambient noise signal; means for processing in frequency domain the digital reflection signal to generate and output a digital time adjusted version of the analog signal; and means for processing in frequency domain the digital canceling signal and the digital time adjusted version of the analog signal to generate and output the digital adjusted version of the analog signal including noise canceling signal to cancel some or all of the ambient noise.

Example 57 may be example 50, wherein means for generating may further comprise means for generating and outputting a digital reflected noise signal; and the noise canceling processor may further generate and output the digital canceling signal based on the reflected noise signal.

Example 58 may be example 57, wherein means for generating may comprise means for processing in time domain the digitally streamed version of the analog audio signal to generate a time domain processed digital version of the analog audio signal, wherein generating and outputting the digital reflected noise signal is further based on the time domain processed digital version of the analog audio signal.

Example 59 may be any one of examples 48-58, further comprising means for establishing a geo-fenced area having the multi-function portable apparatus and a source of the analog audio signal.

Example 60 may be any one of examples 48-58, further comprising means for cooperating with a source of the analog audio signal or a cloud server, to receive an acoustics model of a venue or area having at least the multi-function portable apparatus and the source, or calibration parameter recommendations, and calibrating the multi-function portable apparatus, based at least in part on the received acoustics model or calibration parameter recommendations.

Example 61 may be any one of examples 48-58, further comprising means for sending sample data of the analog audio signal or ambient noise to a source of the analog audio signal or a cloud server.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A multi-function portable apparatus for performing a plurality of functions, comprising:

a microphone to receive a propagated analog audio signal and ambient noise;

a receiver to receive a digitally streamed version of the analog audio signal;

a harmonizer coupled to the microphone and the receiver, that includes a plurality of processors, to generate a digital adjusted version of the analog audio signal including a noise canceling signal to cancel some or all of the ambient noise, based on the propagated analog audio signal, the ambient noise, and the digitally streamed version of the analog audio signal; and a digital-to-analog converter coupled to the harmonizer to convert the digital adjusted version of the analog audio signal to an analog adjusted version of the analog audio signal having noise canceling signal to cancel some or all of the ambient noise;

wherein the analog adjusted version of the analog audio signal having noise canceling signal is outputted to augment the propagated analog audio signal, the augmentation being one of the plurality of functions.

2. The multi-function portable apparatus of claim 1, wherein the analog adjusted version of the analog audio signal is time adjusted to arrive at a listener associated with the multi-function portable apparatus, at proximately a same time as the propagated analog audio signal.

3. The multi-function portable apparatus of claim 1, wherein the harmonizer includes an analog-to-digital converter-filter coupled to the microphone to digitize and filter the received propagated analog audio signal to generate and output a digital ambient signal and one or more digital reflection signals of the propagated analog audio signal.

4. The multi-function portable apparatus of claim 3, wherein the plurality of processors of the harmonizer include a noise canceling processor coupled to the analog-to-digital converter-filter to process the digital ambient signal and to generate and output a digital canceling signal to cancel an ambient noise signal.

5. The multi-function portable apparatus of claim 3, wherein the plurality of processors of the harmonizer further include a frequency domain processor coupled to the analog-to-digital converter-filter to process in a frequency domain the digital reflection signal, and to generate and output a digital reflected noise signal.

6. The multi-function portable apparatus of claim 5, wherein the frequency domain processor is to perform discrete fast Fourier transform on the digital reflection signal.

7. The multi-function portable apparatus of claim 5, wherein the noise canceling processor is to further generate and output a digital canceling signal based on the reflected noise signal.

8. The multi-function portable apparatus of claim 5, wherein the plurality of processors of the harmonizer further include a time domain processor coupled to the receiver and the frequency domain processor, to process in a time domain the digitally streamed version of the analog audio signal, to generate a time domain processed digital version of the analog audio signal, and to provide the time domain processed digital version of the analog audio signal to the frequency domain processor; wherein the frequency domain processor is to further generate and output the digital reflected noise signal based on the time domain processed digital version of the analog audio signal.

9. The multi-function portable apparatus of claim 3, wherein the plurality of processors of the harmonizer further include:

a noise canceling processor coupled to the analog-to-digital converter-filter to process the digital ambient signal and to generate and output a digital canceling signal to cancel an ambient noise signal;

a frequency domain processor coupled to the analog-to-digital converter-filter to process in a frequency domain the digital reflection signal, and to generate and output a digital time adjusted version of the analog audio signal; and a digital signal processor coupled to the noise canceling processor, and the frequency domain processor to process in the frequency domain the digital canceling signal and the digital time adjusted version of the analog audio signal, and to generate and output the digital time adjusted version of the analog audio signal including noise canceling signal to cancel some or all of the ambient noise.

10. The multi-function portable apparatus of claim 9, wherein the frequency domain processor is to further generate and output a digital reflected noise signal; and the noise canceling processor is to further generate and output the digital canceling signal based on the reflected noise signal.

11. The multi-function portable apparatus of claim 10, wherein the plurality of processors of the harmonizer further include a time domain processor coupled to the receiver and the frequency domain processor, to process in a time domain the digitally streamed version of the analog audio signal, to generate a time domain processed digital version of the analog audio signal, and to provide the time domain processed digital version of the analog audio signal to the frequency domain processor; wherein the frequency domain processor is to further generate and output the digital reflected noise signal based on the time domain processed digital version of the analog audio signal.

12. The multi-function portable apparatus of claim 1, further comprising a function engine to perform another function, in addition to or to complement the generation of the analog adjusted version of the analog audio signal having noise canceling signal, wherein the function engine is one of:

a function engine to play media;

a function engine to facilitate a user of the multi-function portable apparatus to call or text another user of another apparatus;

a function engine to establish a geo-fenced area having the multi-function portable apparatus and a source of the analog audio signal;

a function engine to cooperate with a source of the analog audio signal or a cloud server, to receive an acoustics model of a venue or area having at least the multi-function portable apparatus and the source, or calibration parameter recommendations, and to calibrate the multi-function portable apparatus, based at least in part on the received acoustics model or calibration parameter recommendations; or a function engine to send sample data of the analog audio signal or ambient noise to a source of the analog audio signal or a cloud server.

13. A method for augmenting a propagated analog audio signal, comprising:

receiving, with a multi-function portable apparatus, the propagated analog audio signal and ambient noise;

receiving, with the multi-function portable apparatus, a digitally streamed version of the analog audio signal;

generating, with the multi-function portable apparatus, a digital adjusted version of the analog audio signal including noise canceling signal to cancel some or all of the ambient noise, based on the propagated analog audio signal and ambient noise, and the digitally streamed version of the analog audio signal;

converting, with the multi-function portable apparatus, the digital adjusted version of the analog audio signal to an analog adjusted version of the analog audio signal having noise canceling signal to cancel some or all of the ambient noise; and outputting, with the multi-function portable apparatus, the analog adjusted version of the analog audio signal to augment the propagated analog audio signal.

14. The method of claim 13, wherein the analog adjusted version of the analog audio signal is time adjusted to arrive at a listener associated with the multi-function portable apparatus, at proximately a same time as the propagated analog audio signal.

15. The method of claim 13, wherein generating comprises digitizing and filtering the received propagated analog audio signal to generate and output a digital ambient signal and one or more digital reflection signals of the propagated analog audio signal.

16. The method of claim 15, wherein generating comprises processing the digital ambient signal to generate and output a digital canceling signal to cancel an ambient noise signal.

17. The method of claim 15, wherein generating comprises processing in a frequency domain the digital reflection signal to generate and output a digital reflected noise signal; generating and outputting a digital canceling signal based on the reflected noise signal.

18. The method of claim 17, wherein generating comprises processing in a time domain the digitally streamed version of the analog audio signal to generate a time domain processed digital version of the analog audio signal, wherein processing in the frequency domain further comprises generating and outputting the digital reflected noise signal based on the time domain processed digital version of the analog audio signal.

19. The method of claim 15, wherein generating further includes:

processing the digital ambient signal and to generate and output a digital canceling signal to cancel an ambient noise signal;

processing in a frequency domain the digital reflection signal to generate and output a digital time adjusted version of the analog audio signal; and processing in the frequency domain the digital canceling signal and the digital time adjusted version of the analog audio signal to generate and output the digital adjusted version of the analog audio signal including noise canceling signal to cancel some or all of the ambient noise.

20. The method of claim 19, wherein generating further comprises generating and outputting a digital reflected noise signal; and to generate and output the digital canceling signal is further based on the reflected noise signal.

21. The method of claim 20, wherein generating comprises processing in a time domain the digitally streamed version of the analog audio signal to generate a time domain processed digital version of the analog audio signal, wherein generating and outputting the digital reflected noise signal is further based on the time domain processed digital version of the analog audio signal.

22. One or more non-transitory computer-readable medium (CRM) having instructions to cause a multi-function portable apparatus, in response to execution of the instructions by one or more processors of the multi-function portable apparatus, to:

receive a propagated analog audio signal and ambient noise;

receive a digitally streamed version of the analog audio signal;

generate a digital adjusted version of the analog audio signal including noise canceling signal to cancel some or all of the ambient noise, based on the propagated analog audio signal and ambient noise, and the digitally streamed version of the analog audio signal;

convert the digital adjusted version of the analog audio signal to an analog adjusted version of the analog audio signal having noise canceling signal to cancel some or all of the ambient noise; and output the analog adjusted version of the analog audio signal to augment the propagated analog audio signal.

23. The non-transitory CRM of claim 22, wherein the analog adjusted version of the analog audio signal is time adjusted to arrive at a listener associated with the multi-function portable apparatus, at proximately a same time as the propagated analog audio signal.

24. The non-transitory CRM of claim 22, wherein the multi-function portable apparatus is further caused to establish a geo-fenced area having the multi-function portable apparatus and a source of the analog audio signal.

25. The non-transitory CRM of claim 22, wherein the multi-function portable apparatus is further caused to cooperate with a source of the analog audio signal or a cloud server, to receive an acoustics model of a venue or area having at least the multi-function portable apparatus and the source, or calibration parameter recommendations, and to calibrate the multi-function portable apparatus, based at least in part on the received acoustics model or calibration parameter recommendations; or to send sample data of the analog audio signal or ambient noise to the source of the analog audio signal or a cloud server.

* * * * *